United States Patent
Glauning

(10) Patent No.: US 6,921,285 B2
(45) Date of Patent: Jul. 26, 2005

(54) BATTERY PACK SYSTEM FOR HAND POWER TOOLS

(75) Inventor: Rainer Glauning, Aichtal-Groetzingen (DE)

(73) Assignee: Robert Bosch GmbH, Stuttgart (DE)

( * ) Notice: Subject to any disclaimer, the term of this patent is extended or adjusted under 35 U.S.C. 154(b) by 100 days.

(21) Appl. No.: 10/390,839

(22) Filed: Mar. 18, 2003

(65) Prior Publication Data

US 2003/0203669 A1 Oct. 30, 2003

(30) Foreign Application Priority Data

Mar. 22, 2002 (DE) .......................................... 102 12 750

(51) Int. Cl.[7] .............................................. H01R 3/00
(52) U.S. Cl. ..................................................... 439/500
(58) Field of Search ............................ 439/500; 310/50

(56) References Cited

U.S. PATENT DOCUMENTS

| | | | |
|---|---|---|---|
| 3,757,194 A | * 9/1973 | Weber et al. ................ | 320/112 |
| 5,251,329 A | * 10/1993 | Takagi et al. ................ | 455/572 |
| 5,368,954 A | 11/1994 | Bruns ........................... | 429/97 |
| 5,553,675 A | 9/1996 | Pitzen et al. ................. | 173/217 |
| 5,752,205 A | * 5/1998 | Dzung et al. ............. | 455/575.1 |

FOREIGN PATENT DOCUMENTS

| EP | 0 528 478 A1 | 2/1993 |
|---|---|---|
| GB | 2 215 386 A | 9/1989 |

* cited by examiner

*Primary Examiner*—Javaid H. Nasri
(74) *Attorney, Agent, or Firm*—Michael J. Striker

(57) ABSTRACT

A battery pack system for hand power tools has a plurality of battery packs having different sizes, each of the battery packs having a housing with one side provided with a contact elements for an electrical connection between the battery pack and an electrical drive of a hand power tool and with arresting elements for fixing the battery pack on a housing of a hand power tool, wherein in all the battery packs a geometry of the arresting and contact elements is identical.

4 Claims, 4 Drawing Sheets

BATTERY PACK SYSTEM FOR HAND POWER TOOLS

BACKGROUND OF THE INVENTION

The present invention relates to a battery pack system for hand power tools.

More particularly, it relates to a battery pack system for a hand power tool, which is composed of several battery packs of different structural dimensions, wherein each battery packs has on one side of its housing contact elements for electrical connection between the battery pack and the electrical drive of a hand power tool, and arresting elements for fixing the battery pack on the housing of a hand power tool.

U.S. Pat. No. 5,553,675 discloses a hand power tool, which obtains its energy from a battery pack. The battery pack has on one side arresting elements for fixing the battery pack on a foot of the handle of the hand power tool. Moreover, contact elements are provided at the same side of the battery pack for electrical connection between the battery pack and the electric motor in the hand power tool. The components of the battery pack and the geometry of the arresting elements and contact elements are designed for the use of the battery pack for a special hand power tool.

Conventionally a manufacturer of hand power tools operated by the battery packs provide several battery packs of different structural dimensions and nominal currents. Each battery pack with a corresponding structural dimension, nominal current, power and geometry of the arresting and contact elements is associated with a predetermined type of a hand power tool. The utility of such battery pack system is relatively inflexible, since the application of each battery pack is limited to a predetermined type of a hand power tool.

SUMMARY OF THE INVENTION

Accordingly, it is an object of the present invention to provide a battery pack system for hand powertools, which avoids the disadvantages of the prior art.

More particularly, it is an object of the present invention to provide a battery pack system in which individual battery packs can be used for a plurality of different hand power tools.

In keeping with these objects and with others which will become apparent hereinafter, one feature of the present invention resides, briefly stated, in a battery pack system for hand power tools which has a plurality of battery packs having different sizes, each of the battery packs having a housing with one side provided with a contact elements for an electrical connection between the battery pack and an electrical drive of a hand power tool and with an arresting elements for fixing the battery pack on a housing of a hand power tool, wherein in all said battery packs a geometry of said arresting and contact elements is identical.

In the present invention, in all battery packs the geometry of the contact elements and arresting elements arranged at one side of each battery pack housing is identical.

Since in accordance with the present invention, all battery packs which are included in a battery pack system have the same geometry of the contact and arresting elements, therefore for all hand power tools, for example power screwdrivers, hammer drills, saws, grinding devices, etc., the same battery packs can be utilized. A further advantage of the inventive battery pack system is a reduction of quantity of the components, since all battery packs have the same geometry of the contact and arresting elements.

The inventive battery pack system is especially advantageous for the user of different hand power tools, since it can use each battery pack of the system for differently designed hand power tools.

In accordance with the present invention, it is advantageous when in all battery packs the contact and arresting elements have the same distance to one or several reference planes of the battery pack housing. With a corresponding arrangement of the contact and arresting elements on the housing of the different hand power tools, each of the available battery packs can be used for each hand power tool without any problems.

It is advantageous when in accordance with the present invention at least two surfaces located perpendicular to one another are formed on the housing of each battery pack as supporting surfaces, on which a hand power tool provided with a battery pack can be placed. The several standing surfaces which are differently oriented relative to one another, provide for such a battery pack the possibility also for differently designed hand power tools, that they can be supported on one of the standing surfaces of the battery pack connected with the corresponding hand power tool.

A special advantage of the battery pack system is that all its battery packs have the same nominal current. This enables the user to replace a battery pack of a higher power with a battery pack of a lower power and vice versa, in a very flexible manner. Thereby a hand power tool can be operated in the case of emergency with one battery pack of a lower power, when the battery with lower power supplying the required power is discharged. Also, a hand power tool which has a lower power take up and a correspondingly dimensioned battery is discharged can be replaced with a battery of higher power.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
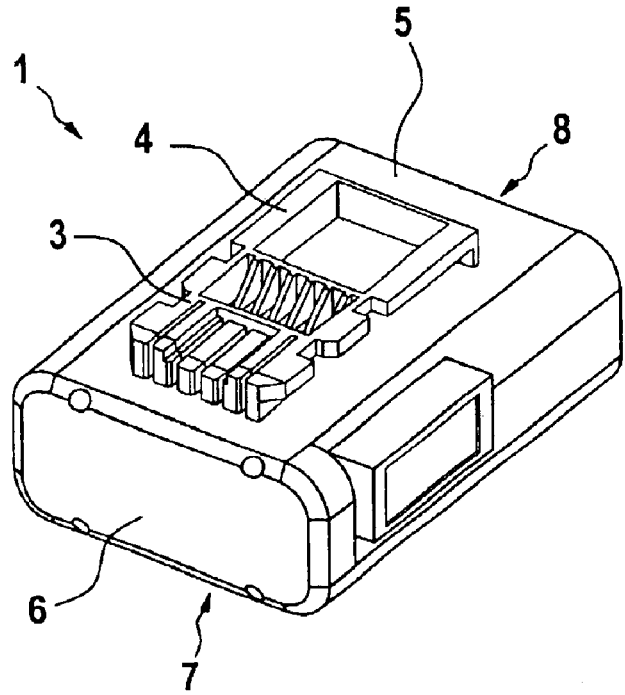
FIG. 1 is a perspective view of a larger battery pack with contact and arresting elements arranged on an upper side.
Figure 2:
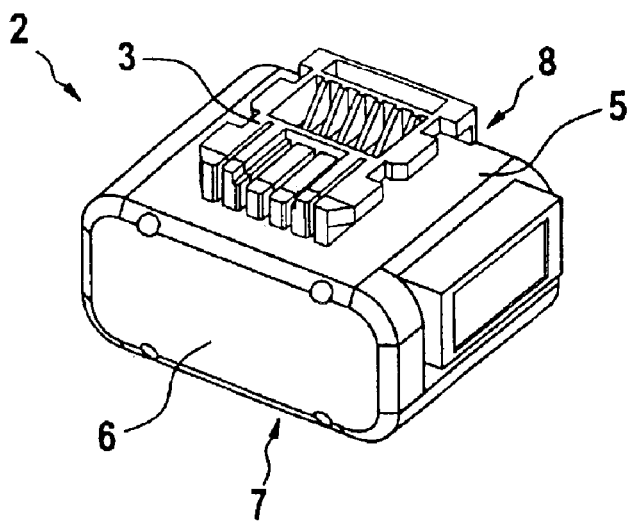
FIG. 2 is a perspective view of a smaller battery pack with contact and arresting elements arranged on its upper side.
Figure 3A:
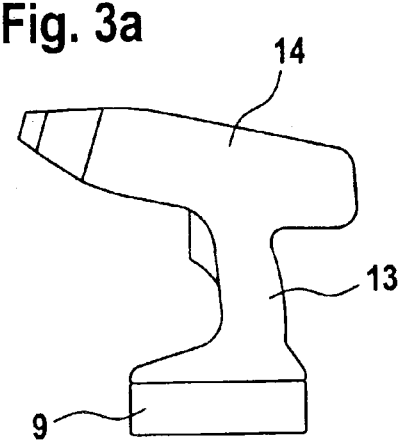
FIGS. 3a–3d show a power screwdriver with battery packs of different dimensions placed on it.
Figure 3B:
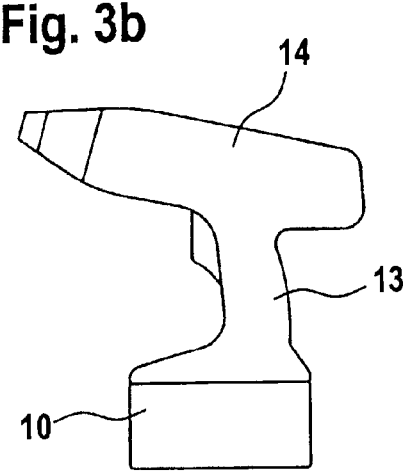
Figure 3C:
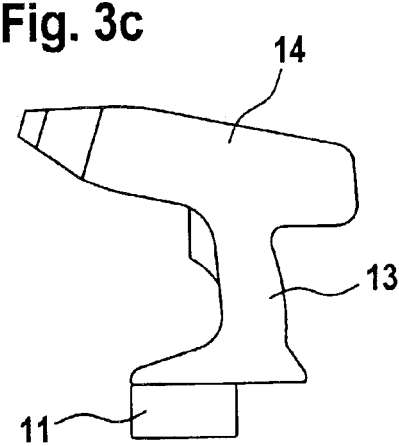
Figure 3D:
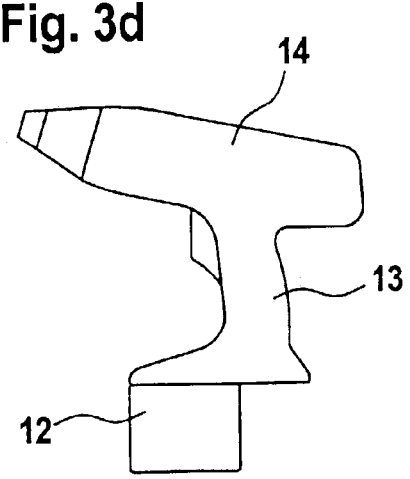
Figure 4A:
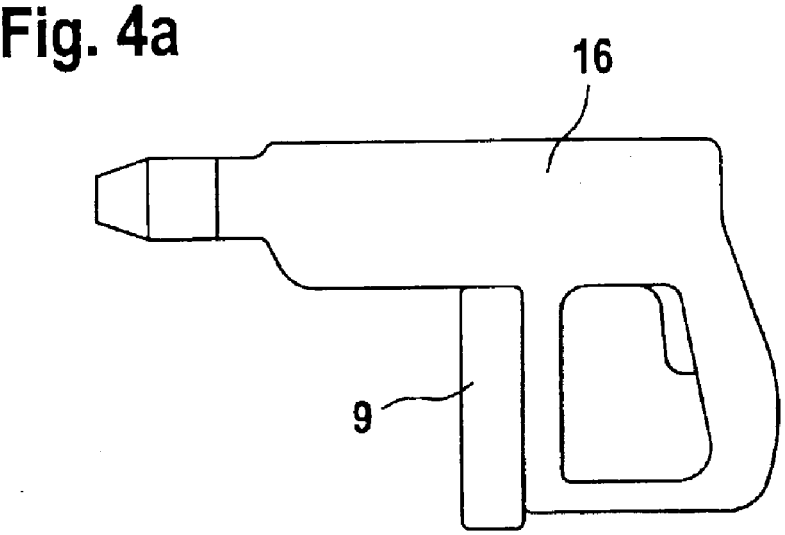
FIGS. 4a–4b are views showing a hammer drill with battery packs of different dimensions arranged on it.
Figure 4B:
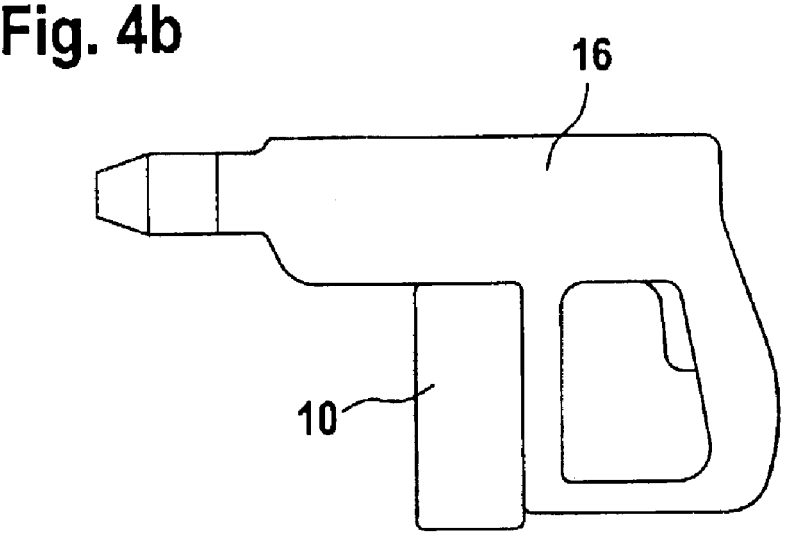

FIG. 1 shows in a perspective view of a larger battery pack 1 of a battery pack system and FIG. 2 shows in a perspective view a smaller battery pack 2 of the battery pack system. Here for example the battery packs of two different sizes are illustrated. In principle, a battery pack system can have several battery packs which differ from one another in their heights and widths.

All battery packs which belong to the same battery pack system advantageously have the same nominal current, even when they are designed for different powers. This enables a user to replace a battery with a higher power by a battery with a lower power, and vice versa in a very flexible manner. Thereby a hand power tool can be operated in the case of emergency with a battery of lower power, when the battery which provides the required power is discharged. Also, a hand power tool which has a lower power consumption and a correspondingly dimensioned accumulator, can be replaced by a battery of higher power.

For mechanically fixing each battery pack 1, 2 on the housing of a hand power tool, arresting elements are required and must be provided. Also, on each battery pack contact elements must be provided for establishing an electrical connection between the battery pack and the electrical drive of a hand power tool. As shown in FIGS. 1 and 2, joint arresting and contact elements 3 are arranged on one housing side of each battery pack 1, 2 The arresting and contact elements 3 are here not disclosed in detail, since the arresting and contact elements can be of any type, as known in the prior art. For example, however the contact elements can be introduced in a block placed on the battery pack 1, 2, on which the arresting elements are formed, so that they are not accessible from outside, to exclude short circuiting between the contacts.

The arresting and contact elements 3 for all battery packs 1, 2, regardless of their dimensions, have the same geometry, so that each battery pack of the battery pack system can be placed on each available hand power tool. For providing an optimal hold of a larger battery pack 1 on a hand power tool, it is advisable to provide at the end of the contact and arresting element 3 an elongated holding rail 4 which can be engageable with a corresponding holding rail on the associated hand power tool.

It is advantageous when the battery packs 1, 2 have a quadrangular shape. This provides for a possibility of arranging the arresting and contact elements 3 on two housing sides of the battery pack 1, 2 which are perpendicular to one another. In the shown embodiments the arresting and contact elements 3 are arranged on the upper side 5 of the corresponding battery pack 1, 2. Since several housing sides 5, 6, are provided for mounting of the arresting and contact elements 3, a very flexible possibility for utilization of the battery packs for a plurality of different hand-power tools is provided.

The housing side 7 which is opposite to the housing side 5 provided with the arresting and contact elements 3, and also the perpendicularly located housing sides 6 and 8 can be used as standing surfaces, on which a hand power tool provided with a battery pack 1, 2 can be placed. Correspondingly the housing side 6, 7 and 8 are shaped so that a hand power tool can reliably stand on it.

Figure 5A:
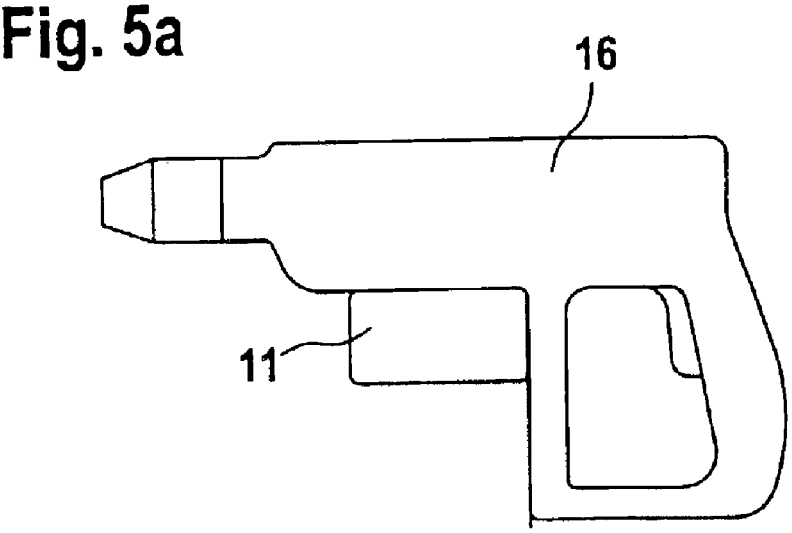
FIGS. 5a–5b are views showing a hammer drill with battery packs of different dimensions arranged on it.
Figure 5B:
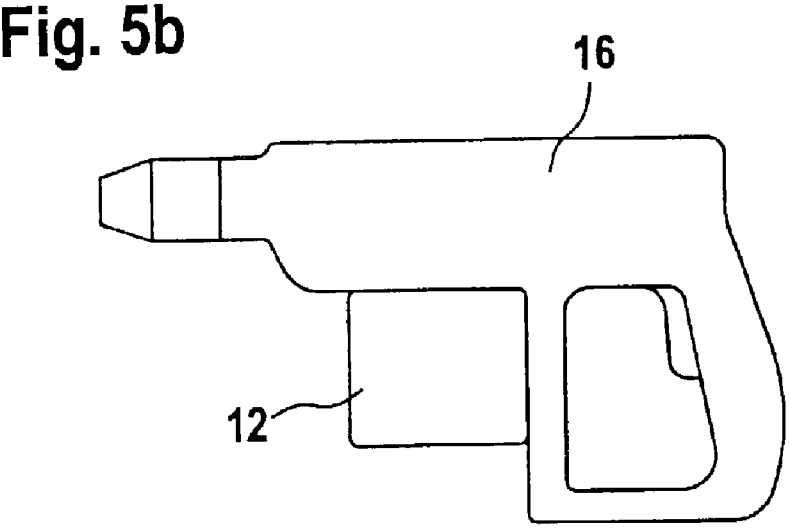

FIGS. 3a, 3b, 3c and 3d show the use of the battery packs 9, 10, 11 and 12 of different sizes on a foot of the handle 13 of a power screwdriver 14. The same battery packs 9, 10, 11 and 12 of different dimensions can be used also on another hand power tool, for example a hammer drill as shown in FIGS. 4a, 4b, 5a, and 5b. However, as shown in FIGS. 5a and 5b, many battery packs 11, 12 because of their structural dimensions and their place of use on the hand power tools, can not be used for supporting the hand power tools.

While FIGS. 3, 4 and 5 present examples of embodiments of the battery packs for corresponding electrical hand power tools, the battery packs of the battery pack system can be used also in other devices, such as hand circular saws, grinding devices, etc.

For the universal use of all battery packs, not only the same geometry of the arresting and contact elements 3 is important, but also it is advantageous when the arresting and contact elements 3 have the same distance to one or several reference planes of the housing of the battery pack.

For the battery packs 1, 2 shown in FIGS. 1 and 2, the reference plane for the arresting and contact elements 3 is the housing side 6 which is located perpendicular to the arresting and contact elements. The arresting and contact elements 3 of all battery packs 1, 2 have the same distance to the reference plane represented by the housing side 6.

Depending on the construction of the hand power tool for which the battery pack system must be utilized, it is eventually also advantageous to maintain a fixed distance to one further housing side, which distance is the same for all battery packs.

It will be understood that each of the elements described above, or two or more together, may also find a useful application in other types of constructions differing from the types described above.

While the invention has been illustrated and described as embodied in battery pack system for hand power tools, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A battery pack system for hand power tools, comprising a plurality of battery packs having different sizes, each of the battery packs having a housing with one side provided with a contact elements for an electrical connection between the battery pack and an electrical drive of a hand power tool and with arresting elements for fixing the battery pack on a housing of a hand power tool, wherein all said battery packs a geometry of said arresting and contact elements is identical, wherein at least two surfaces on the housing of each battery pack which are located perpendicular to one another are substantially flat and not connected to additional elements and thereby formed as standing surfaces, on which a hand power tool provided with the battery pack is supportable.

2. A battery pack as defined in claim 1, wherein in all said battery packs a distance from said arresting and contact elements to at least one reference plane of the housing of the battery pack is identical.

3. A battery pack as defined in claim 1, wherein in all said battery packs a distance form said arresting and contact elements to several reference planes of the housing of the battery pack is identical.

4. A battery pack as defined in claim 1, wherein all battery packs of the battery pack system have a same nominal current.

* * * * *